United States Patent [19]
Patti et al.

[11] Patent Number: 5,696,848
[45] Date of Patent: Dec. 9, 1997

[54] SYSTEM FOR CREATING A HIGH RESOLUTION IMAGE FROM A SEQUENCE OF LOWER RESOLUTION MOTION IMAGES

[75] Inventors: Andrew J. Patti, Mt. View, Calif.; M. Ibrahim Sezan; P. Erhan Eren, both of Rochester, N.Y.

[73] Assignee: Eastman Kodak Company, Rochester, N.Y.

[21] Appl. No.: 588,004

[22] Filed: Jan. 17, 1996

Related U.S. Application Data

[63] Continuation-in-part of Ser. No. 401,396, Mar. 9, 1995, abandoned.
[51] Int. Cl.$^6$ .................................................. G06K 9/40
[52] U.S. Cl. .......................... 382/254; 382/299; 382/300
[58] Field of Search ................................. 382/254, 298, 382/299, 300, 308

[56] References Cited

U.S. PATENT DOCUMENTS

| | | | |
|---|---|---|---|
| 4,797,942 | 1/1989 | Burt | 382/41 |
| 5,187,754 | 2/1993 | Currin et al. | 382/54 |
| 5,241,608 | 8/1993 | Fogel | 382/16 |
| 5,341,174 | 8/1994 | Xue et al. | 348/576 |

FOREIGN PATENT DOCUMENTS

| | | | |
|---|---|---|---|
| WO 94/10653 | 5/1994 | WIPO | G06K 9/36 |

OTHER PUBLICATIONS

Tekalp et al., "High-Resolution Image Reconstruction from Lower-Resolution Image Sequences and Space-Varying Image Restwation", IEEE, Sep. 1992, pp. 169–172.
Patti, Andrew J. et al., "New Approaches for Space-Variant Image Restoration", IEEE, Apr. 1993, pp. 261–264.
M. Bierling, "Displacement estimation by hierarchical blockmatching", 1988, SPIE, Visual Communications and Image Processing, vol. 1001, pp. 942–951.
A. M. Tekalp et al., "High Resolution Image Reconstruction From Lower-Resolution Image Sequences and Space-Varying Restoration", 1992, IEEE, pp. III169–III172.
M. Irani et al., "Motion Analysis for Image Enhancement: Resolution, Occlusion, and Transparency", Dec. 1993, Journal of Visual Communication and Image Representation, vol. 4, No. 4, pp. 324–335.
S. Mann et al., "Virtual Bellows: Constructing High Quality Stills From Video", 1994, IEEE, pp. 363–367.
M. Irani et al., "Improving Resolution by Image Registration", May 1991, Graphical Models and Image Processing, vol. 53, No. 3, pp. 231–239.
M. I Sezan, "An overview of convex projections theory and its application to image recovery problems", 1992, Ultramicroscopy, 40, pp. 55–67.
J. R. Bergen et al., "A Three-Frame Algorithm for Estimating Two-Component Image Motion", Sep. 1992, IEEE Transactions on Pattern Analysis and Machine Intelligence, vol. 14, No. 9, pp. 886–896.
A. E. Savakis et al., "Blur Identification by Residual Spectral Matching", Apr. 1993, IEEE Transactions on Image Processing, vol. 2, No. 2, pp. 141–151.

(List continued on next page.)

Primary Examiner—Jose L. Couso
Assistant Examiner—Matthew C. Bella
Attorney, Agent, or Firm—Thomas H. Close

[57] ABSTRACT

A robust system, adaptive to motion estimation accuracy, for creating a high resolution image from a sequence of lower resolution motion images produces a mapping transformation for each low resolution image to map pixels in each low resolution image into locations in the high resolution image. A combined point spread function (PSF) is computed for each pixel in each lower resolution image employing the mapping transformations provided that they describe accurate motion vectors. The high resolution image is generated from the lower resolution images employing the combined PSF's by projection onto convex sets (POCS), where sets and associated projections are defined only for those pixels whose motion vector estimates are accurate.

8 Claims, 9 Drawing Sheets

OTHER PUBLICATIONS

M. I. Sezan et al., "Adaptive Image Restoration with Artifact Suppression Using the Theory of Convex Projections", Jan. 1990, *IEEE Transactions on Acoustics, Speech, and Signal Processing*, vol. 38, No. 1, pp. 181–185.

S. Kuo et al., "Refinement of EM Restored Images Using Adaptive POCS", 1991, *IEEE*, pp. 2925–2928.

M. K. Ozkan et al., "POCS–Based Restoration of Space–Varying Blurred Images", Jul. 1994, *IEEE Transactions on Image Processing*, vol. 3, No. 4, pp. 450–454.

M. I. Sezan et al., "Iterative Image Restoration with Ringing Suppression Using the Method of POCS", 1988, *IEEE*, pp. 1300–1303.

M. I. Sezan et al., "Adaptive Nonlinear Image Restoration Using the Theory of Convex Projections", 1988, *IEEE*, pp. 959–962.

A. M. Tekalp, et al., "Decision–Directed Segmentation For The Restoration Of Images Degraded By A Class of Space–Variant Blurs", 1988, *IEEE*, pp. 980–983.

A. E. Savakis, et al., "Restorations of Real Defocused Images Using Blur Models Based on Geometrical and Diffraction Optics", 1991, *IEEE*, pp. 919–922.

J. R. Bergen, et al., "A Three–Frame Algorithm for Estimating Two–Component Image Motion", 1992, *IEEE*, pp. 886–896.

A. J. Patti, et al., "High Resolution Standards Conversion of Low Resolution Video", 1995, *IEEE*, pp. 2197–2200.

A. J. Patti, et al., "High Resolution Image Reconstruction From A Low–Resolution Image Sequence In The Presence Of Time–Varying Motion Blur", 1994, *IEEE*, pp. 343–347.

A. J. Patti, et al., "New Approaches For Space–Variant Image Restoration", 1993, *IEEE*, pp. V261–V264.

LOW-RES SAMPLING LATTICE    HI-RES SAMPLING LATTICE (a)  (b)

PIXELS USED IN THE SAD COMPUTATION (DIAMOND LATTICE, 3×3 WINDOW)

SYSTEM FOR CREATING A HIGH RESOLUTION IMAGE FROM A SEQUENCE OF LOWER RESOLUTION MOTION IMAGES

CROSS REFERENCE TO RELATED APPLICATIONS

This is a Continuation-in-Part of application Ser. No. 08/401,396, filed Mar. 9, 1995, now abandoned, entitled "System for Creating a High Resolution Image from a Sequence of Lower Resolution Motion Images".

The disclosure in the microfiche appendix contains two (2) fiche having 113 frames material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The present invention is related to the field of digital image processing, and more specifically to a technique for obtaining a high-resolution still image from a sequence of motion images that are of lower resolution, suffering from blur and noise, and under-sampled over an arbitrary lattice.

BACKGROUND OF THE INVENTION

The present invention relates to a method and apparatus for reconstructing high-resolution still images from multiple motion images (i.e., images containing relative displacement) that are under-sampled over an arbitrary spatiotemporal lattice and may suffer from blur and noise degradation. The lower-resolution, degraded, multiple motion images may be a series of still images of a particular scene, acquired by an electronic still camera operating sequentially in time, or may be frames digitized from a video signal.

Such images are usually undersampled over a sparse spatial lattice (i.e., sampling lattice) due to the presence of a color filter array that samples color channels over a sparse set of points, and/or due to interlacing. In addition, such images suffer from blur and noise. The blur may be due to sensor integration, and/or relative motion between the scene and the camera, and/or nonzero aperture time, and/or camera optics such as defocused lenses. The imaging sensor, and the digitization and quantization processes introduce noise. We refer to images that suffer from one or more of these effects as lower resolution images.

Given a multitude of lower resolution images, it is often desirable to create a still image that is of higher quality, for various purposes, such as creating a good quality hard copy print. The resulting still image should have a larger number of samples, preferably over a regular rectangular lattice that is denser than that of the given images, to reduce aliasing effects, and should be free of the effects of blur and noise.

In U.S. Pat. No. 5,341,174, Xue et al., describe a method, where the resulting image is obtained by mapping samples from neighboring images onto a selected image, on the basis of relative motion information, in order to increase the number and density of its samples. This approach is limited to interlaced video and does not account for blur and noise degradations. If the data is degraded by blur and/or noise, it is used as it is.

Blur due to the integration at the sensor is accounted for in producing a still image in methods discussed in M. Irani and S. Peleg, "Motion analysis for image enhancement: resolution, occlusion, and transparency," J. of Visual Comm. and Image Representation, Vol. 4, pp. 324–335, December 1993.; S. Mann and R. Picard, "Virtual bellows: Constructing high-quality stills from video," in IEEE Int. Conf. Image Proc., (Austin, Tex.), November 1994.; M. Irani and S. Peleg, "Improving resolution by image registration," CVGIP: Graphical Models and Image Processing, vol. 53, pp. 231–239, May 1991. These methods, however, do not account for the aperture time, and hence do not properly handle the motion blur. Furthermore, they do not model, and hence do not account for, the noise degradation. Consequently, the still images created by these methods may still suffer from motion blur and noise degradation. Furthermore, these methods assume that the input lower resolution images are sampled over a regular, rectangular lattice. If the input images are obtained from an interlaced video, for instance, they should first be deinterlaced (i.e., converted to progressive images sampled over a regular rectangular lattice) prior to the application of the method. Otherwise, the methods are limited to non-interlaced, progressive input images.

The method of HIGH RESOLUTION reconstruction discussed in A. M. Tekalp et. al., "High-resolution image reconstruction from lower-resolution image sequences and space-varying image restoration," in IEEE Int. Conf. Acoust., Speech, and Signal Proc., (San Francisco, Calif.), vol. III, pp. 169–172, March 1992, have used a projections onto convex sets (POCS) based method that accounts for blur due to sensor integration and noise. It does not however account for motion blur, and is applied to non-interlaced, progressive input images only.

SUMMARY OF INVENTION

One of the objects of this invention is to provide a high-resolution reconstruction method that appropriately handles inaccurate motion estimates and addresses the effects of all above mentioned degradations, namely degradations in the resulting image due to inaccurate motion estimates, aliasing (due to spatial undersampling over an arbitrary lattice), sensor blur (due to spatial integration at the sensor, and temporal integration during the aperture time in the presence of relative scene-sensor motion), optical blur (due to defocused lenses), and noise (sensor and quantization noise), in creating a high-quality still image.

Another object of the invention is to provide a method that can be utilized in a digital still image camera equipped with a high-resolution mode. The high-resolution mode works by invoking a "burst" mode, in which successive images with relative motion are rapidly acquired, and then processed according to the method using either in-camera hardware, or off-line software/hardware processing capabilities, to produce a high resolution still image. Alternatively, successive images containing relative motion can be acquired using an ordinary electronic still camera. One other object of the invention is to provide a method that can be utilized to process images that are acquired by a video camera. Images are processed according to the present invention using either in-camera hardware, or off-line software/hardware processing capabilities, to produce a high resolution still image. The high resolution image is spatially sampled with higher density than is intrinsic to the color filter array (CFA) detector and is non-interlaced. Such a camera is useful, for example, in a desktop video conference system in instances where transmission of very high resolution still images of text, drawings, or pictures is desired.

The objects are achieved according to the present invention by providing a system for creating a high resolution image from a sequence of lower resolution motion images that produces a dense motion vector field for each low resolution image to map pixels in each low resolution image into locations in the high resolution image. A combined point spread function (PSF) is computed for each pixel in each lower resolution image employing the mapping transformations. The high resolution image is generated from the lower resolution images employing the combined PSF's by projection onto convex sets (POCS).

The present invention has the advantage that it is capable of appropriately handling inaccurate motion estimates and processing images that are sampled over an arbitrary lattice without the need for a preprocessing step where the input has to be interpolated over a regular rectangular lattice unless it is readily sampled over a regular rectangular lattice. The invention uses the method of projections onto convex sets (POCS) in developing a reconstruction method which is amenable to simultaneous handling of blur, noise, and images sampled over arbitrary lattices. The present invention also allows for flexibility in dealing with motion estimates. It allows for a high resolution image reconstruction that is adaptive to the accuracy of motion estimation. Motion estimates are used in estimating the motion blur and during the high-resolution image reconstruction process. If the estimated motion of a particular pixel of a given low-resolution image is inaccurate, the blur point spread function (PSF) computed for that pixel using the motion vector will be inaccurate. Inaccurate motion vector will also adversely affect the reconstruction process because the position of the low-resolution pixel relative to the high-resolution image will be in error. A combination of these factors will cause undesirable degradations in the reconstructed image. It is therefore necessary to detect inaccurate motion estimates and appropriately handle them. A method for determining the accuracy of motion estimation and subsequently handling inaccurate motion estimates in the context of POCS is described in the following Section. The POCS allows the exclusion of pixels of low resolution images, whose motion vector estimates are inaccurate, from the reconstruction process and thus avoiding possible degradations in the reconstructed image.

In the context of POCS, pixel values of low resolution images whose motion vectors are inaccurate are excluded from the reconstruction process.

BRIEF DESCRIPTION OF DRAWINGS

FIG. 2 is a diagram showing lower resolution sampling lattices and the sampling lattice of the high resolution image according to the present invention.;

DETAILED DESCRIPTION OF INVENTION

Figure 1:
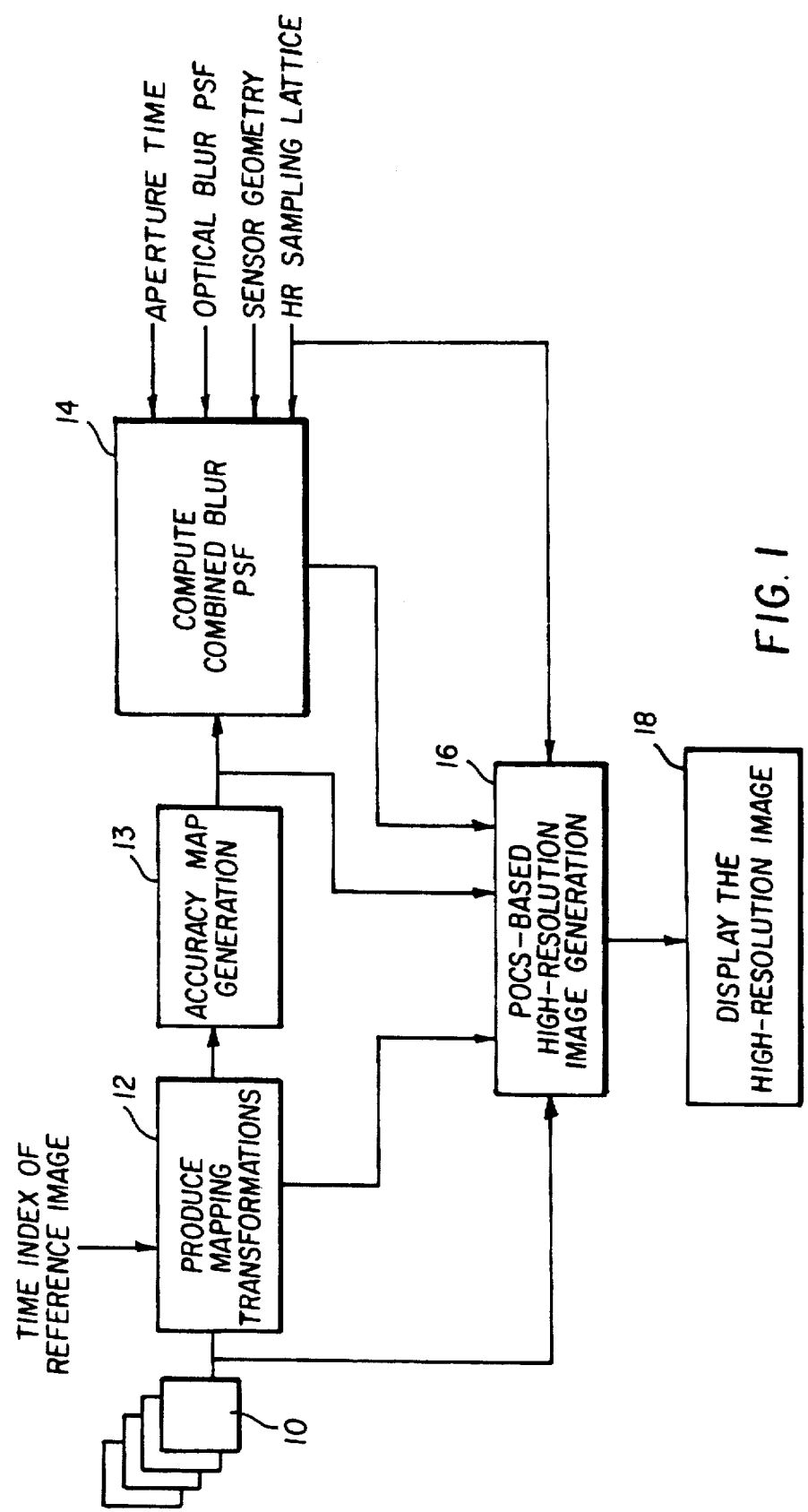
FIG. 1 is a block diagram illustrating the major steps of the invention.

The major steps of the present invention are depicted in the flow diagram shown in FIG. 1, where a number of lower resolution motion images 10 are presented as the input to the image processing method. One of the input images is selected, by a user, from the input set of lower resolution images 10. This image is referred to as the reference image and it is that image whose high resolution version will be reconstructed. The reference image is specified by its time index $t_r$.

The present invention has four major processing steps. In referring to FIG. 1, the first processing step 12 provides mapping transformations that map the pixels in each lower resolution input image into locations in the high resolution image. To produce the mapping transformations, a motion vector is estimated for each pixel in each one of the other lower resolution images relative to the lower resolution reference image. A motion estimation method, such as the well-known hierarchical block matching method with fractional pixel accuracy, can be used. Alternatively, the motion estimation method disclosed in U.S. Pat. No. 5,241,608 issued Aug. 31, 1993 to Fogel may be employed to estimate the motion vector field. The block matching method is based on a locally translational motion model. Another possibility is to use affine motion models, as will be described later on, that model zoom, rotation and shear in addition to translation, within a region.

The second processing step 13 is for detecting motion estimation accuracy for motion vector fields estimated for each one of the low-resolution images. This step detects the accuracy of motion vector estimates and generates a binary accuracy map array for each one of the low-resolution images. The array has the same number of pixels as the corresponding low-resolution images and its entries contains a "1" if the motion vector at the corresponding pixel location is accurate. Otherwise, it contains a "0".

The third processing step 14 uses the mapping transformation information, made available by the preceding step 12, the motion estimation accuracy map, made available by step 13, aperture time, sensor geometry, optical blur point spread function (PSF), and the high resolution sampling geometry (HR) to compute the combined blur PSF that accounts for the motion and optical blur, and blur due to integration at the sensor. When the motion vector is inaccurate, the blur PSF at that pixel location is not computed since that pixel is not going to be used in high resolution image reconstruction, as will be discussed below. Computation of the combined blur PSF is based on an image formation model that is described below.

The high resolution image is created in the fourth step 16 where the motion estimation accuracy map, combined blur PSF, the motion information from the mapping transformations, and the given lower resolution images 10 are used in a method based on POCS, described in detail in the article by M. I. Sezan, "An overview of convex projections theory and its applications to image recovery problems," Ultramicroscopy, no. 40, pp. 55–67, 1992. The high resolution image reconstructed at this final step is an estimate of the high resolution version of the reference image that has a larger number of samples over a denser, regular rectangular sampling geometry (HR), regardless of the sampling lattice pattern of the input lower resolution images, and is free from blur and noise degradation. Finally, the high resolution image is displayed 18 on a display device such as a CRT or a printer.

Figure 2:
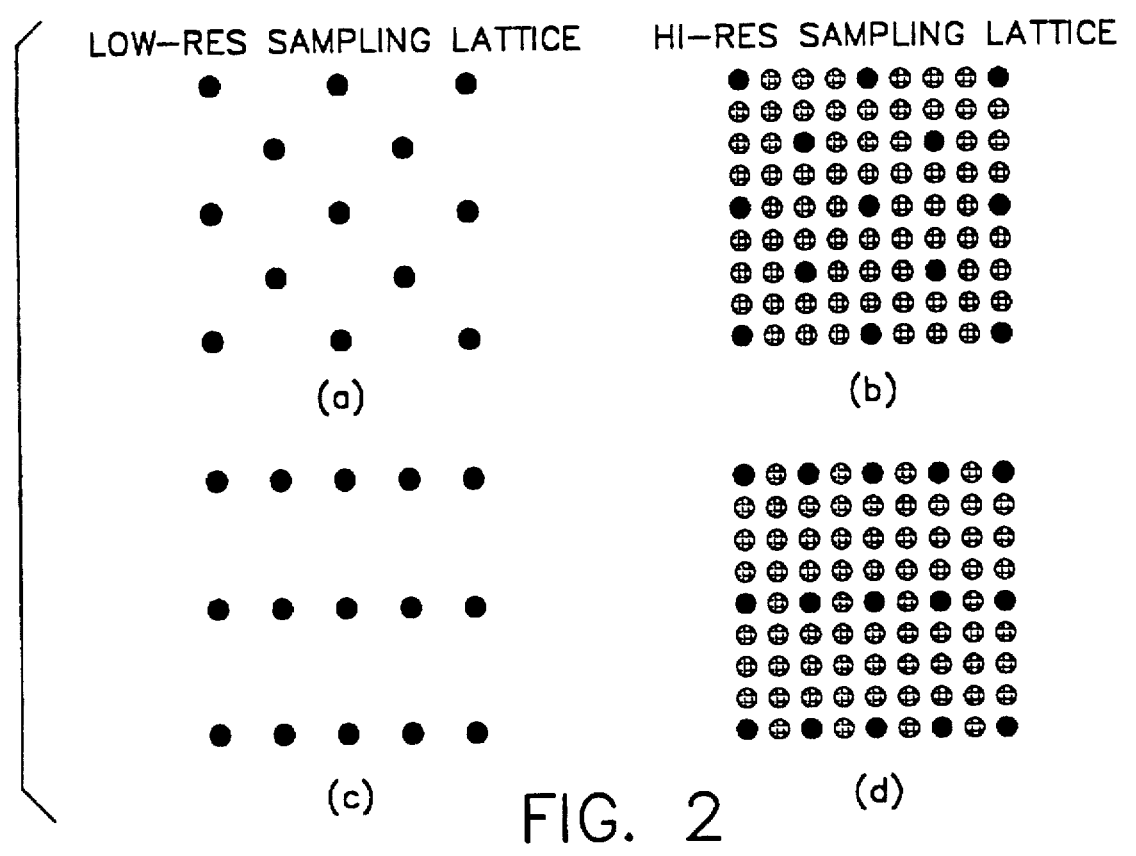

The lower resolution images may be sampled with different sampling patterns at different times. When this happens, a sampling lattice describes the periodic change in the sampling patterns. Typical sampling lattice patterns for lower resolution, and the high resolution image are depicted in FIG. 2. Pattern (a) shows a diamond-shaped lattice, Pattern (c) is an interlaced lattice, and Pattern (b) and (d) show the denser lattice over which the high resolution image is reconstructed. The open circles in the diagram denote the new samples generated by the high resolution reconstruction process, and the solid circles denote the sampling pattern in the lower resolution image. Note that FIG. 2 shows a 2× increase in the effective sampling density. The method of the present invention allows for higher factors of increase, if desired. Note also that one can generate a high resolution sequence by processing not one but all of the lower resolution images in a sequential manner, each time designating one of the images as the reference image. Such a process would be useful for example to produce high resolution video.

Figure 3:
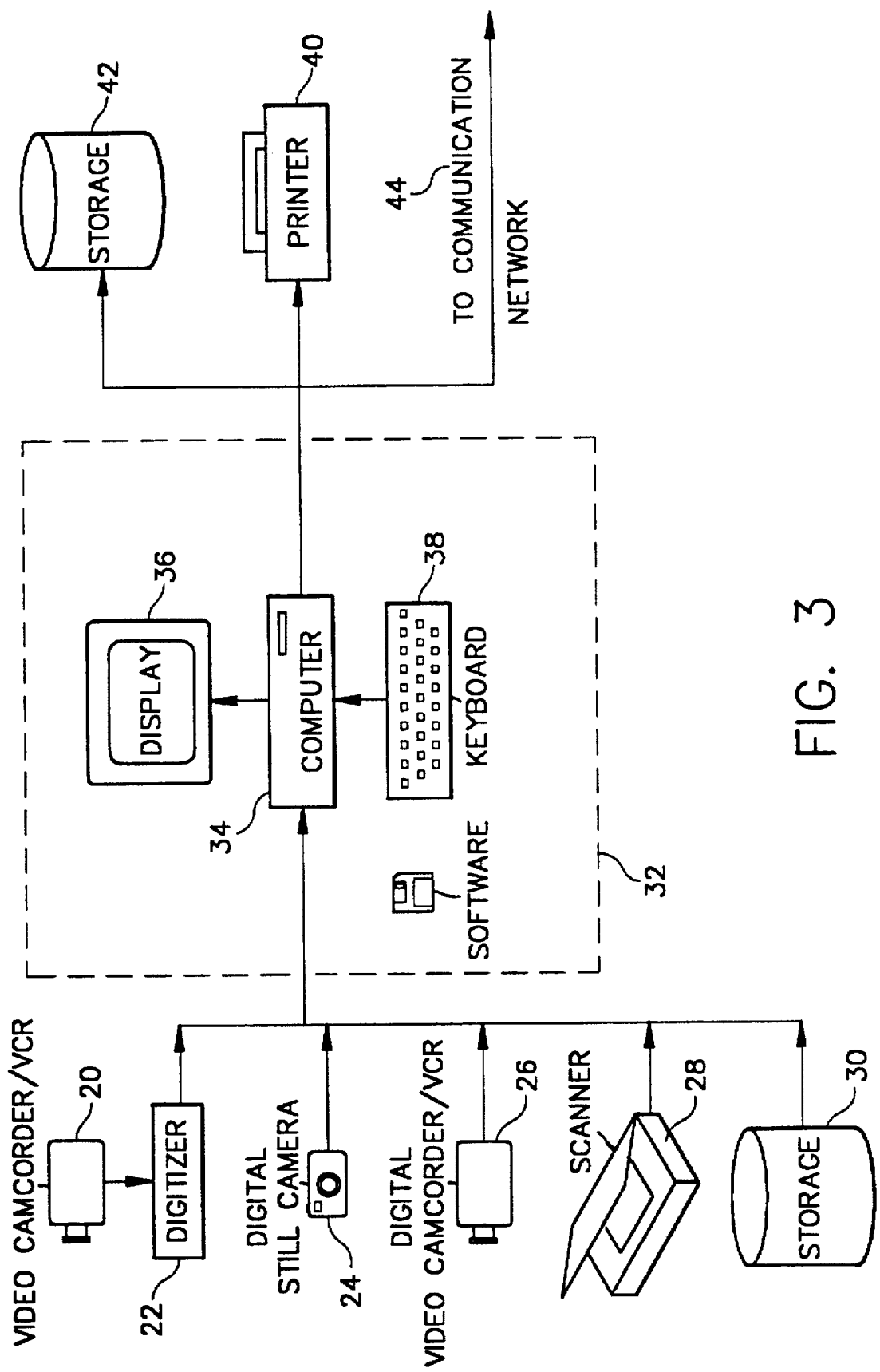
FIG. 3 is a schematic diagram depicting a system suitable for implementing the present invention.

Referring to FIG. 3, a system useful in practicing the present invention is shown. Input devices such as a video camcorder/VCR 20 connected to a digitizer 22, a digital still camera 24, a digital video camcorder 26, a digital scanner 28 or a disc storage 30 provide a source of a motion sequence of digital images. The motion sequence of digital images are supplied to an image processing computer system generally 32. The image processing computer system includes a computer 34 such as a Power PC, a CRT display 36 having typically SVGA or better resolution, and an operator input device such as a keyboard 38 or a mouse. The computer 34 is connected to an output device such as a printer 40 for creating a hard copy display of the high resolution image; a storage medium 42 such as an optical disc for storage pending eventual display of the image; or link to a communication network 44 for distributing the high resolution image for remote display.

Figure 4:
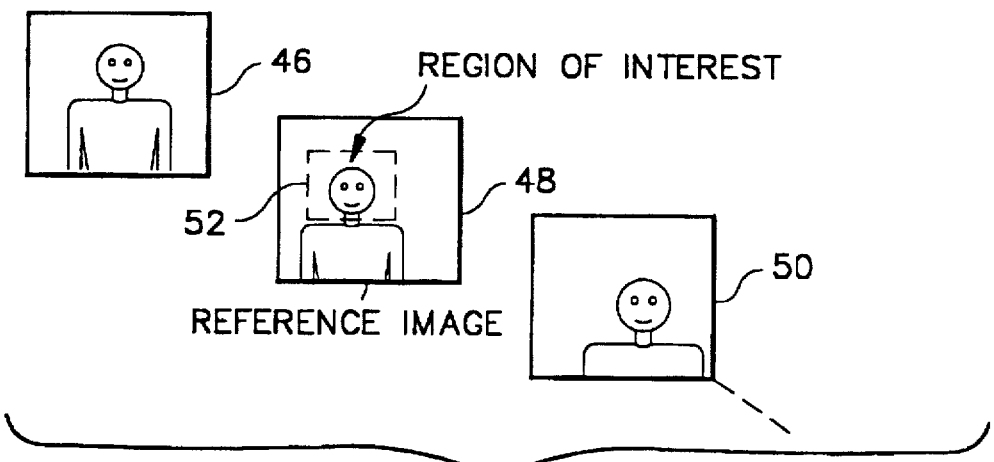
FIG. 4 is a diagram illustrating a sequence of lower resolution images and a selected region of interest within one of the lower resolution images.

Once the multiple low resolution images are available to the computer system 32 for display on CRT 36, it is also possible for a user to interactively specify a region of interest in the reference image and confine the resolution improvement process to that region. FIG. 4 shows a sequence of low resolution images 46, 48 and 50, where region of interest 52 in image 48 has been identified for high resolution processing. In this case, the high resolution version of the selected region is reconstructed over a high resolution sampling geometry, and the result is then down-sampled over the lattice of the lower resolution image and then placed into the region of interest replacing the values of the original pixels. In the depiction in FIG. 4, the face of the person forms the region of interest 52; In the resulting image, the facial detail will be available at high resolution. The user may visually identify regions that correspond to the selected region of interest 52. Then the process is applied only to these regions, rather than to the entire lower resolution images, resulting in computational savings.

A. Mapping Transformation

Figure 5:
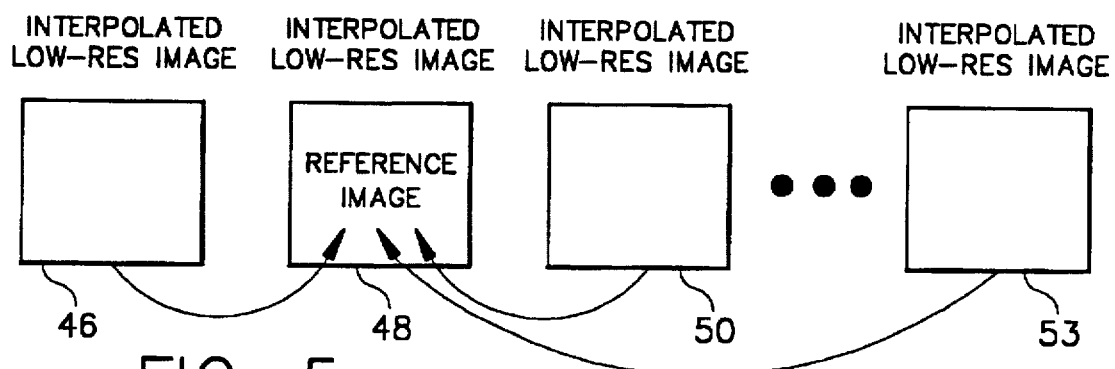
FIGS. 5 and 6 are diagrams useful in describing the method of producing a mapping transformation according to the present invention.

Motion is estimated from the each one of the lower resolution images to the reference image, resulting in M−1 motion vector fields for M lower resolution images to provide a mapping transformations that map lower resolution image pixels to the high resolution image sampling locations. This is graphically depicted in FIG. 5. In the simplest case, the motion from the lower resolution image 46 to the reference image 48 can be modeled as a spatially uniform translation. In practice, however, we have found this model to be sub-optimal. The hierarchical block matching method or the Fogel algorithm, to estimate non-uniform translational motion, and methods based on affine models and estimators are more effectively used to estimate the motion vector fields.

Figure 6:
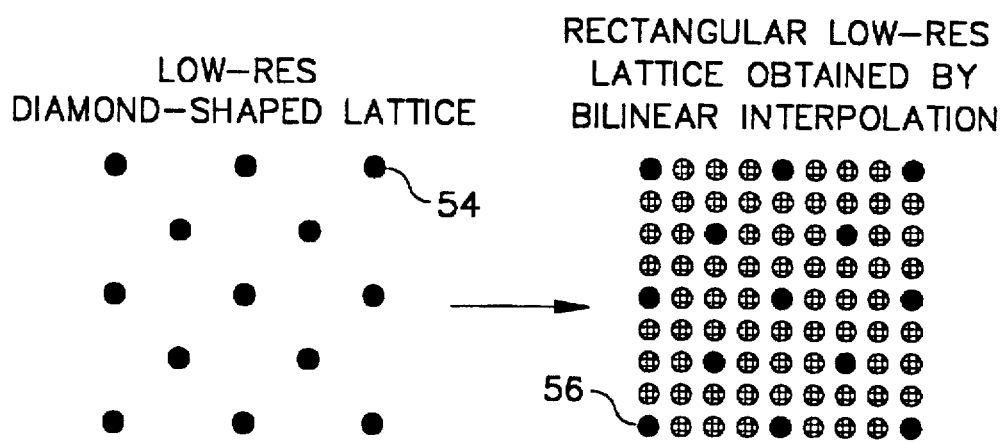

The lower resolution images 46, 48, 50, 53, sampled over a low resolution sampling lattice, $\Lambda_S$, are first bilinearly interpolated over a rectangular lower resolution lattice, $\Lambda_L$, for the purpose of motion estimation, unless they are already available over a rectangular lattice. For example, a diamond-shaped lower resolution input lattice 54 and the corresponding lower resolution rectangular lattice 56 are depicted in FIG. 6. The interpolated values of the reference image are only used for motion estimation and subsequently discarded and replaced with the estimates during the POCS-based high resolution reconstruction process. A motion vector is estimated for each actual pixel of the lower resolution images, resulting in M−1 motion vector field estimates.

In the case of a block matching method of motion estimation, or the Fogel motion estimation algorithm, the motion is assumed to be locally translational. When other transformation effects are small, this approximation can be quite effective.

The hierarchical block matching method (HBM) discussed in M. Bierling, "Displacement estimation by hierarchical block matching," in Proc. SPIE Visual Communications and Image Processing '88, pp. 942–951, 1988 is used to estimate the non-uniform motion field. The matching criterion used is the mean absolute difference (MAD) between measurement blocks. At each level in the hierarchy, a logarithmic type search is used.

The preferred parameter values that can be used in the implementation of a 5-level HBM are furnished in Table 1, where the first column is the hierarchy level number, and level 1 is the lowest resolution level.

TABLE 1

| Level | Max Displ. | | Window Size | | Filter Size | | Step Size | SSF | Accuracy |
| --- | --- | --- | --- | --- | --- | --- | --- | --- | --- |
| | hor. | vert. | hor. | vert. | hor. | vert. | | | |
| 1 | 31 | 31 | 128 | 128 | 10 | 10 | 32 | 8 | 1 |
| 2 | 15 | 15 | 64 | 64 | 10 | 10 | 16 | 8 | 1 |
| 3 | 7 | 7 | 64 | 64 | 5 | 5 | 8 | 4 | 1 |
| 4 | 3 | 3 | 28 | 28 | 5 | 5 | 4 | 4 | 1 |
| 5 | 1 | 1 | 12 | 12 | 3 | 3 | 3 | 2 | 0.25 |

The maximum horizontal/vertical displacement (Max Disp. hor./vert.) is the displacement used in the first step of the logarithmic search. The horizontal/vertical measurement window size (Window Size hor./vert.) is the size of the window over which the MAD is computed. The horizontal/vertical filter size (Filter Size hor./vert.) specifies the support of a Gaussian filter, with variance set to ½ of the support size. The step size is the horizontal and vertical distance between neighboring pixels in the reference image for which an estimate of the motion is computed, the subsampling factor (SSF) is the horizontal and vertical subsampling used when computing the MAD over the measurement window, and the accuracy of estimation is in terms of the sampling period of the lower resolution rectangular lattice. Note that all units for the parameters are relative to the spatial sampling period of the lower resolution rectangular lattice $\Lambda_L$ (i.e., refinement to ¼-pixel accuracy, relative to the lower resolution rectangular lattice, is performed in the final level of HBM).

In the specific implementation, we have used the Fogel algorithm noted above since it produces more accurate motion estimates in general. The implementation of the invention, however, is not restricted to the Fogel algorithm.

Significant non-translational mapping transformations (resulting from rotations, shears and zooms) cannot be accurately modeled using the block matching techniques described above. It is preferable to model inter-image motion resulting in such mapping transformations using a global affine transformation defined by the parameters $c_1-c_6$ in the following equation:

$$g(x_1+c_1+c_2x_1+c_3x_2,x_2+c_4+c_5x_1+c_6x_2,t)=g(x_1,x_2,t_r) \quad (1)$$

where $(x_1,x_2)$ denote the continuous spatial coordinates and g() denote the image intensity distribution of the lower resolution images. The technique that can be used to estimate the parameters $c_1-c_6$ is described in J. Bergen, P. Burt, R. Hingorani, and S. Peleg, "A three-frame algorithm for estimating two-component image motion," IEEE Trans. Pattern Anal. Intel., vol. 14, pp. 886–896, September 1992. This estimation method requires spatial and temporal derivatives to be estimated. The spatial derivatives are estimated using a 2-D second-order polynomial least-squares fit over a 5×5 window centered at each pixel, while the temporal derivatives are computed using a 2-point finite forward difference at each pixel. Prior to estimating these derivatives, the images are blurred using an 11×11 pixel uniform blur to reduce the effects of noise.

In case of color imagery, motion is estimated in the luminance domain. The same motion information is then used in separately processing the primary color channels (e.g., red, green, and blue) of the given lower resolution images. Therefore, an RGB to luminance and two chroma (e.g., YUV) transformation is applied to the lower resolution images prior to motion estimation for forming the mapping transformations.

B. Determining The Accuracy of Motion Estimation

We denote the sampling points of the low resolution lattice $\Lambda_S$ by $\{(m_1,m_2,k)\}$. The sampling points of the rectangular low resolution lattice, $\Lambda_L$, over which motion estimation is performed, are denoted as $\{(l_1,l_2,k)\}$. Indeed, $\{(m_1,m_2,k)\}\subset\{(l_1,l_2,k)\}$, where "⊂" denotes the subset relationship. The estimated motion vectors can be used to obtain a motion-compensated estimate of each one of the other images from the reference image, over $\Lambda_L$. In other words, the reference image is motion compensated (aligned) to each one of the other images. We denote the intensity distribution of the compensated reference frame, obtained using the motion vector estimates emerging from the image $g(l_1,l_2,t_r+i)$ at time $t_r+i$, and pointing at the reference frame $g(l_1,l_2,t_r)$ at $t_r$, as $g^{MC_i}(l_1,l_2,t_r)$, where i=1, 2 . . . M−1, and refers to "motion compensated". For vectors pointing at interpixel positions, bilinear spatial interpolation is used to compute the motion compensated reference image.

Accuracy of motion estimation can be determined for each image $g(l_1,l_2,t_r+i)$ by comparing it with $g^{MC_i}(l_1,l_2,t_r)$ on the basis of summed absolute difference (SAD) computed over a window of pixels. The SAD for a 3×3 window is defined as $$S(l_1,l_2,t_r+i) = \sum_{p=-1}^{1}\sum_{q=-1}^{1}|g(l_1+p,l_2+q,t_r+i)-g^{MC_i}(l_1+p,l_2+q,t_r)|.$$

Figure 7:
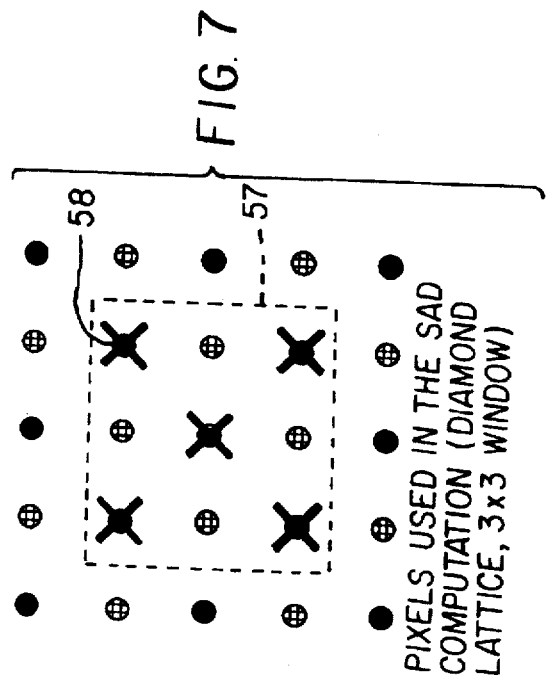
FIG. 7 is a diagram showing the samples that contribute to a SAD computation within a 3×3 window in the case of a diamond sampling grid.

Motion estimation accuracy map, $A(m_1,m_2,t_r+i)$, for each low resolution image other than the reference image, is defined over the lattice $\{(m_1,m_2,k)\}=\Lambda_S$. Its entries are defined as $A(m_1,m_2,t_r+i)=1$ if $S(m_1,m_2,t_r+i)\le\theta(m_1,m_2,t_r+i)$; and $A(m_1,m_2,t_r+i)=0$, otherwise, where $\theta(m_1,m_2,t_r+i)$ is a predetermined threshold. The summation in the SAD calculation is limited to those samples that coincide with the actual pixels of the low resolution images. For example, for a low resolution, diamond sampling grid, interpolated to a low resolution rectangular grid, a 3×3 window of pixels 57 is shown in FIG. 7 along with the actual samples 58 that contribute to the SAD calculation.

We have found that the quality of the high resolution image is improved when the motion accuracy map $A(m_1,m_2,k)$ is further postprocessed by spatial morphological operators to make the regions with accurate and inaccurate motion estimates more homogenous and connected. First, the isolated "0" entries, associated with inaccurate vectors within a predominantly accurate region, are eroded using an appropriate erosion operator. Next, the inaccurate regions are dilated (i.e., enlarged) using an appropriate dilation operator. Erosion and dilation operations are well-known and understood in the standard digital image processing literature and discussed in, for example, W. K. Pratt, *Digital Image Processing*, Wiley 1991, p. 453–461. In the case of interlaced or progressively sampled low resolution images we have used a 3×3 rectangular structuring element for erosion and a 9×9 rectangular structuring element for dilation. Erosion is defined as follows: If the center value of a 3×3 window is a "0" but there is at least one value within the window which is a "1", then the center value is switched to "1". In case of dilation, if the center value within the 9×9 window is a "1" but there is at least one "0" value within the window, then the center value is switched to "0" For other types of low resolution spatial sampling geometries appropriate erosion and dilation structuring elements can be defined in a similar fashion (e.g., a diamond shaped structuring element for diamond sampling geometry).

We now explain how the threshold $\theta(m_1,m_2,t_r+i)$ can be determined. It can be set to an appropriate constant, determined experimentally, for all low-resolution pixel locations $(m_1,m_2)$. However, we have found that a space-varying threshold, varying with the spatial image characteristics at $(m_1,m_2)$ does improve the performance. A space-varying, dynamic threshold is determined on the basis of the following observations. First, errors in motion estimation inaccuracy detection result in objectionable degradations in image regions with low spatial frequency content. It is therefore desirable to have a low threshold value for such image regions. On the other hand, it is in high-spatial frequency regions that high resolution image generation using motion compensation will produce the greatest increase in resolution. Therefore, in regions of high spatial frequency, the detection threshold should be high.

Figure 8:
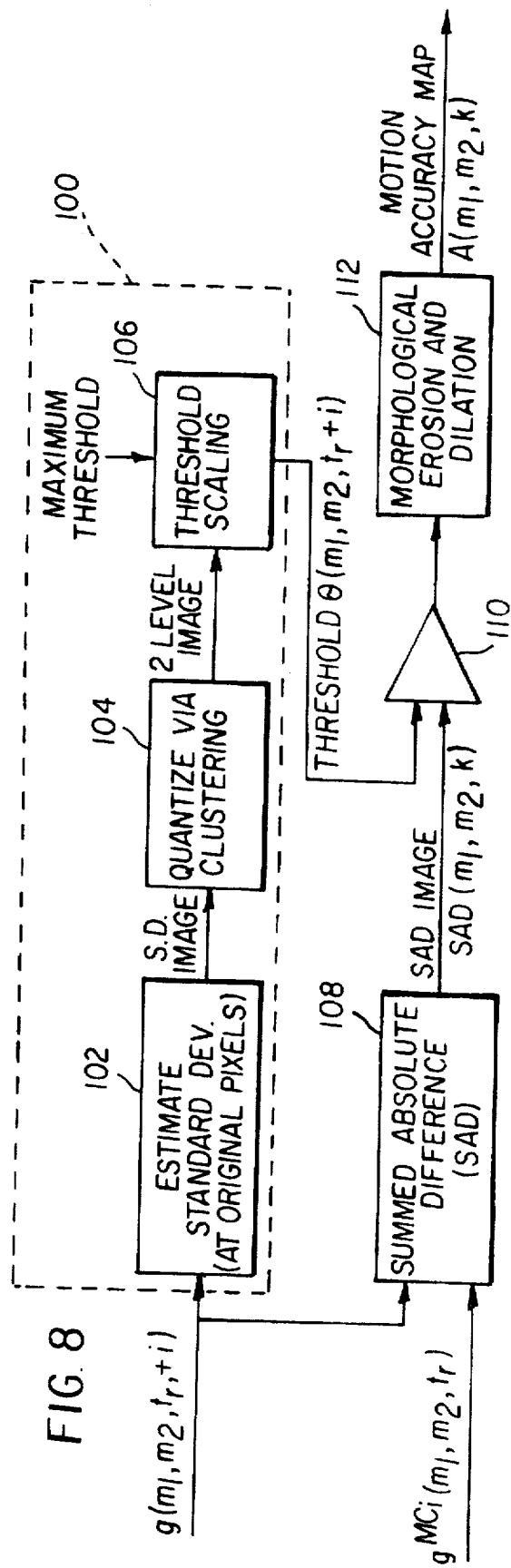
FIG. 8 is a block diagram showing the generation of a motion accuracy map.

FIG. 8 shows a block diagram summarizing the entire motion estimation accuracy detection process, including the determination of the dynamic threshold 100. The first step in threshold determination is to locally estimate 102 a sample standard deviation of the image $g(m_1,m_2,t_r+i)$ at every original pixel location computed over a predetermined number of its closest neighbors whose relative locations would depend on the sampling geometry. For instance, in case of interlaced or progressive sampling, pixels within a 3×3 rectangular block (i.e., 9 pixels including the pixel itself) is used to compute the sample variance associated with the pixel at the center of the 3×3 window. The standard deviation values can be stored as a 2-D image, for each low resolution image other than the reference image, sampled over $\Lambda_S$. We refer to this image as the S.D image. To spatially adapt the threshold to the S.D image, but remove dependency on abnormally high values for standard deviation, the S.D image is dynamically quantized 104 into 2 levels using, for example, the well-known K-means algorithm with K=2 (see J. S. Lim, Two-Dimensional Signal and Image Processing, Prentice Hall, 1990, page 607.) The 2-level standard deviation image output from the dynamic quantization process is then normalized to the interval [0,1], and used to scale 106 a user-specified maximum threshold. This results in two thresholds that adapt to regions of lower and higher variance. Each pixel location $(m_1, m_2)$ is thus assigned to one of these thresholds, i.e., $\theta(m_1, m_2, t_r+i)$ is a 2-D binary array. The regions of the largest quantized standard deviation use the specified maximum threshold, and as the standard deviation decreases in the remaining quantization level so does the threshold. These thresholds are then applied to the SAD image 108 in comparator 110 to produce an initial motion accuracy map, and the final motion accuracy map, $A(m_1, m_2, k)$, is produced following the morphological filtering (erosion and dilation) 112 as explained above. We have obtained very good performance when we set the maximum threshold to 30, in case of numerous test images.

C. Modeling and Computing The Combined PSF

Computation of the combined PSF is based on an image formation and blur model. In the following we describe this model that is then used in computing the combined PSF.

We first describe a model that relates the given lower resolution images, to the actual high resolution image, at a particular reference time $t_r$, through a continuous linear shift variant (LSV) blurring relationship. Towards this end, first, an image formation model is described. The mapping transformations are then incorporated into the formation model, resulting in the desired LSV relationship expressed in terms of a combined blur PSF. Next, a discretization is presented to relate a discrete version of the high resolution image to the observed lower resolution imagery, by means of a corresponding discrete LSV relationship, expressed in terms of a discrete combined blur PSF. Finally, a practical method is provided to compute the combined PSF for subsequent reconstruction of the high resolution image.

Image Formation Model

Figure 9:
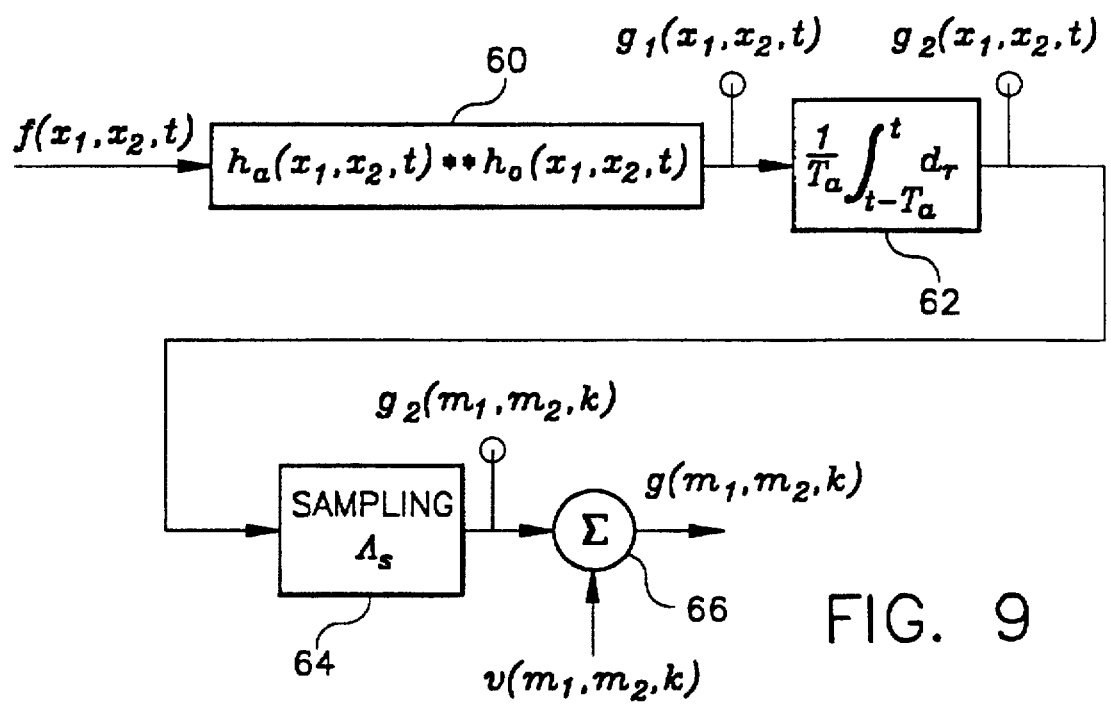
FIG. 9 is a block diagram illustrating the image formation model used for calculating the combined PSF according to the present invention.

The image formation model we use is depicted in FIG. 9. In the figure, the input signal $f(x_1, x_2, t)$ denotes the actual high resolution imagery in the continuous domain, whose discrete estimate is desired. The effects of the physical dimensions of the lower resolution sensor, i.e., blur due to integration over the sensor area, and the blur of the optical system are modeled in the first stage 60 of the figure. The high resolution imagery $f(x_1, x_2, t)$ is convolved with both the kernel representing the shape of the sensor $h_a(x_1, x_2, t)$, and the optical blur kernel $h_o(x_1, x_2, t)$. These are both functions of time, but we restrict them to be constant over the aperture time. The optical blur and aperture dimensions are thus allowed to differ from image to image.

The effect of aperture time is modeled in the second stage 62 of FIG. 9 by a time-domain integrator whose output is given by $$g_2(x_1,x_2,t) = \frac{1}{T_a} \int_{t-T_a}^{t} g_1(x_1,x_2,\tau)d\tau, \quad (2)$$

where $T_a$ denotes the sensor aperture time. Note that the first two stages 60 and 62 commute, since the first is spatially linear shift-invariant (LSI) and the second is temporally LSI.

The third stage 64 in FIG. 9 models low resolution sampling using the arbitrary space-time lattice $\Lambda_s$. The output of this stage is denoted by $g_2(m_1,m_2,k)$. As a matter of convention, integer values $m_1$, $m_2$, and $k$, that appear as a function argument, are interpreted as in $$g_2(m_1,m_2,k) = g_2(x_1,x_2,t)\big|_{[x_1,x_2,t]^t = V_s[m_1,m_2,k]^t} \quad (3)$$

where $V_s$ denotes the matrix that specifies the sampling lattice, and t denotes the transpose operation. In the last modeling step 66, additive noise due to the lower resolution sensor is added to the sampled video signal.

Including Motion

We now incorporate a motion model into the image formation model to establish the desired LSV relationship between the lower resolution imagery and the desired high resolution image at a fixed but arbitrary time instance $t_r$. By appropriately setting the value(s) of $t_r$, a single still high resolution image, or high resolution video images, comprised of a sequence of high resolution images, can be reconstructed.

When a motion model is applied to the image formation model, the first two stages 60 and 62 in FIG. 9 can be combined to form a single LSV relation. We begin by considering motion as in $$f(x,t) = f(M(x,t,t_r),t_r) = f(x_r,t_r), \quad (4)$$

where x denotes $(x_1, x_2)$, and $M(x,t,t_r)$ is a mapping transformation relating the position of an intensity at position x and time t, to its position at time $t_r$. This equation expresses the well-known assumption of intensity conservation along motion trajectories. By letting $h_1(x,t) = h_a(x,t) ** h_o(x,t)$, the output of the first modeling stage can be expressed as $$g_1(x,t) = \int h_1(x-\chi)f(\chi,t)d\chi \quad (5)$$

Figure 10:
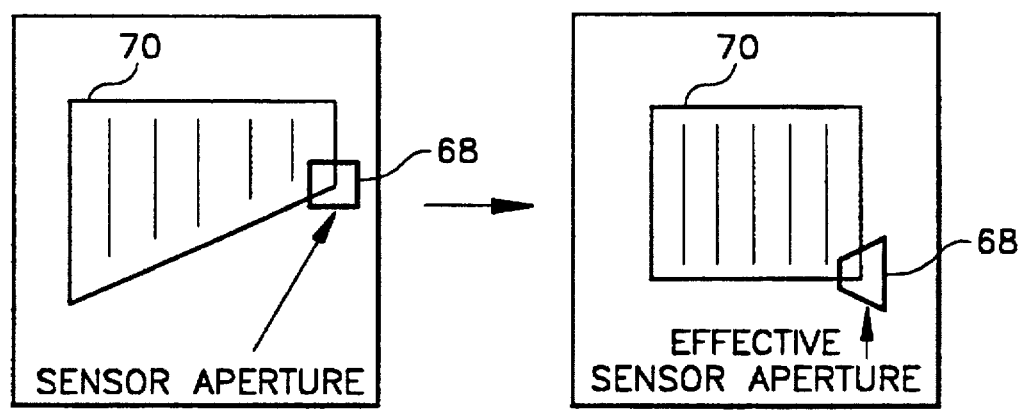
FIG. 10 is a diagram illustrating the effective transformation of the blur PSF due to relative motion between lower resolution images in the sequence.

By making the change of variables $x_{t_r} = M(\chi, t, t_r)$ and using (4), (5) becomes $$g_1(x,t) = \int h_1(x - M^{-1}(x_{t_r},t,t_r))f(x_{t_r},t_r)|J(M)|^{-1}dx_{t_r}, \quad (6)$$

where, $M^{-1}$ denotes the inverse transformation, $J(M)$ denotes the Jacobean of M, and |.| denotes the determinant operator. It is evident from (6) that the first stage of the model has been transformed into an LSV operation, acting on a high resolution image at time $t_r$. To reflect this fact, we let $$h_1(x;x_{t_r},t,t_r) = h_1(x - M^{-1}(x_{t_r},t,t_r))|J(M)|^{-1} \quad (7)$$

denote the combined LSV blur point spread function (PSF) modeling the effect of the sensor geometry, optical blur, and relative motion. The effect of this equation is depicted in FIG. 10, where the picture at the left depicts the imaging process at time t, where the aperture 68 of a sensor element is imposed on the picture. The picture to the right shows the equivalent imaging process at time $t_r$. Notice the mapping transformation applied to the aperture 68 in going from time $t$ to $t_r$ is the inverse of the mapping transformation applied to the image 70. Rewriting (6) in LSV form yields $$g_1(x,t) = \int h_1(x;x_r;t,t_r)f(x_r,t_r)dx_r \qquad (8)$$

The second modeling stage can now be expressed as $$g_2(x,t) = \int_{t-T_a}^{t} \int h_1(x;x_r;\tau,t_r)f(x_r,t_r)\,dx_r\,d\tau \qquad (9)$$

By changing the order of the integrations, the above becomes $$g_2(x,t) = \int h_2(x;x_r;t,t_r)f(x_r,t_r)dx_r \qquad (10)$$

where, $$h_2(x;x_r;t,t_r) = \int_{t-T_a}^{t} h_1(x,x_r;\tau,t_r)d\tau. \qquad (11)$$

Thus the first two stages of the model have been combined into a single LSV system, acting on the continuous high resolution image at time $t_r$. This allows us to write the observed lower resolution imagery in terms of a continuous high resolution image at time $t_r$, as $$g(m_1,m_2,k) = \int h_2(m_1,m_2;x_r;k,t_r)f(x_r,t_r)dx_r + v(m_1,m_2,k), \qquad (12)$$

where $h_2(*)$ is the effective LSV blur PSF, and the integer arguments $m_1$, $m_2$, and $k$ have the same interpretation as in (3).

Discretization

It is desirable to discretize the LSV blur relationship in (12), to relate the observed lower resolution images to a discrete version of the actual high resolution image $f(x_1,x_2,t_r)$. Thus, a discrete superposition summation of the form $$g(m_1,m_2,k) = \qquad (13)$$
$$\sum_{(n_1,n_2)} f(n_1,n_2,t_r)h_{t_r}(n_1,n_2;m_1,m_2,k) + v(m_1,m_2,k),$$

will now be formulated. We assume that the continuous imagery $f(x_1,x_2,t_r)$ is sampled on the 2-D lattice $\Lambda t_r$, i.e. $(n_1,n_2)$ are integers that specify a point in $\Lambda t_r$, by a high resolution sensor, to form $f(n_1,n_2,t_r)$. By appropriately choosing $t_r$ and $\Lambda t_r$, sampling of $f(n_1,n_2,t_r)$ can be formed over an arbitrary space-time lattice.

An individual high resolution sensor element (giving rise to a single high resolution image pixel) is assumed to have physical dimensions which can be used as a unit cell $U_{t_r}$ for the lattice $\Lambda_{t_r}$. Thus, the entire space of the focal plane is completely covered by the high resolution sensor. The term $U_{t_r}(n_1,n_2)$ is used to denote the unit cell $U_{t_r}$ shifted to the location specified by $(n_1,n_2)$. With this definition, and with the assumption that $f(x_1,x_2,t_r)$ is approximately constant over $U_{t_r}(n_1,n_2)$, (12) can be written as $$g(m_1,m_2,k) = \qquad (14)$$

-continued
$$\sum_{(n_1,n_2)} f(n_1,n_2,t_r) \int_{U_{t_r}} \int_{(n_1,n_2)} h_2(m_1,m_2;x_r;k,t_r)dx_r + u(m_1,m_2,k).$$

By comparing (13) with (14), it is evident that $$h_{t_r}(n_1,n_2;m_1,m_2,k) = \int_{U_{t_r}} \int_{(n_1,n_2)} h_2(m_1,m_2;x_r;k,t_r)dx_r, \qquad (15)$$

where the integer arguments $m_1$, $m_2$, $k$, $n_1$, and $n_2$ are interpreted as in (3).

Figure 11:
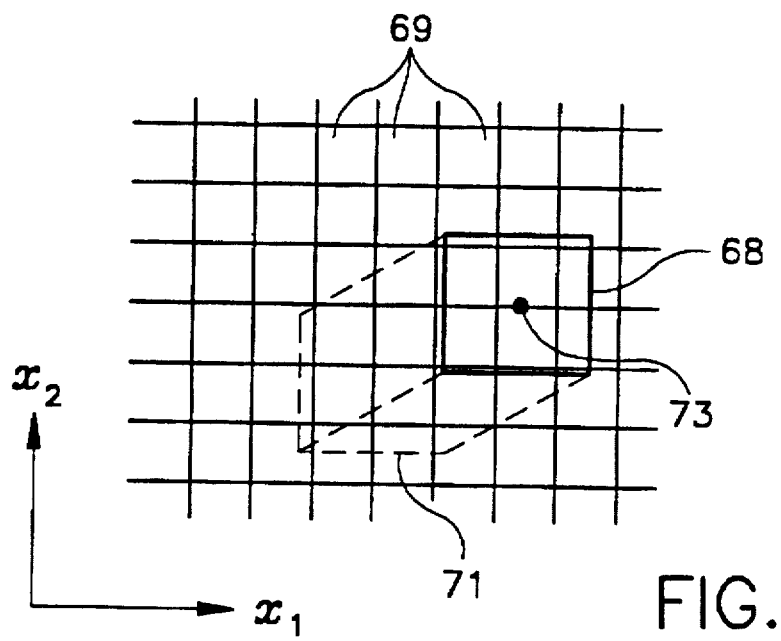
FIG. 11 is a diagram useful in describing the PSF for the case of translational motion.

A pictorial example of the discrete LSV PSF formulation, with a rectangular high resolution lattice $\Lambda_{t_r}$, is provided in FIG. 11. In the figure, it is assumed that the motion is purely translational, that a square lower resolution sensor aperture 68 centered on a point $(m_1, m_2)$ 73 is used, and that there is no optical blur. The $(x_1,x_2)$ space is the sensor focal plane at time $t_r$. The focal plane is shown covered by shifted high resolution sampling unit cells $U_{t_r}(n_1,n_2)$ 69. The region of the focal plane "swept" by the lower resolution sensor aperture 68 during the aperture time $T_a$ is shown by dotted outline 71. The discrete LSV PSF specified in (15) is formed by computing the duration of time a given area of the lower resolution sensor 68 "dwelled" over a region $U_{t_r}(n_1,n_2)$ 69, while translating from its position at the aperture opening time, to its position 73 at the aperture closing time. Note that the result indicated by (15) does not specify a simple area of overlap between the area 71 swept by sensor aperture 68 and the high resolution sampling regions $U_{t_r}(n_1,n_2)$ 69.

Computation of the Combined PSF

A practical method for computing the blur function $h_{t_r}(.)$ given by (15) is described. Two cases will be treated to serve this goal. In the first case, translational motion is assumed. In the second case, general image motion is considered. To solve this second case, a general approximation is given, that leads to a blur computation method that is built on top of the method delineated for the translational motion case. Relative to this approximation, we provide specific methods for affine and perspective transformation models of motion. The combined blur PSF is computed only for those $\{(m_1,m_2,k)\}$ for which $A(m_1,m_2,k)=1$ since low resolution pixels with inaccurate motion estimates are excluded from the reconstruction process as will be described later.

1) Translational motion.

For the case of translational motion, we define piece wise constant velocity motion paths, effective during the $k^{th}$ opening of the aperture (i.e. acquiring the $k^{th}$ lower resolution image at time $t_k$), as $$x_{t_r} = M(x,t,t_r) = x + x_{b_k} + v_k(t-(t_k-T_a)), \qquad (16)$$

where the velocities $v_{1,k}$ and $v_{2,k}$, where $v_k = [v_{1,k}\ v_{2,k}]^T$, are assumed to be constant over the aperture time $T_a$, $(t_k-T_a)$ is the time of the $k^{th}$ opening of the aperture, and $x_{b_k}$ denotes the relative initial position at the $k^{th}$ opening of the aperture. The quantity $x_{b_k}$ is a function of the times $t_k$ and $t_r$. If for the moment the optical blur is ignored, then the PSF $h_2(x,x_r;t,t_r)$ is LSI, and by defining $h+_2(x-x_r,t,t_r) = h_2(x;x_r;t,t_r)$ and applying (7) and (11)

$$h'_2(x;t,t_r) = \frac{1}{T_a} \int_0^{T_a} h_a(x+x_{b_k}+v_k\tau)d\tau \qquad (17)$$

Figure 12:
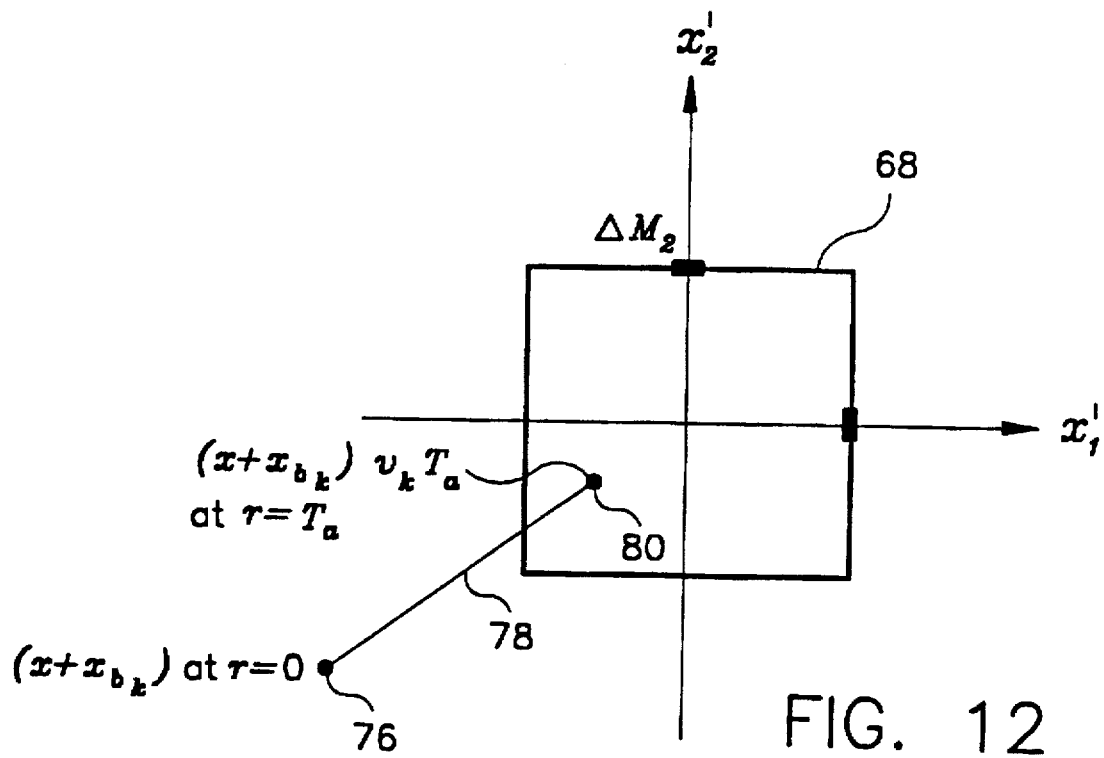
FIG. 12 is a diagram depicting the procedure for computing the LSI blur function $h'_2(x_1,x_2,t,t_r)$.

If we now assume the aperture response is a 2-D "rect" function given by $$h_a(x_1, x_2) = \begin{cases} \frac{1}{\Delta M_1 \Delta M_2}; & -\frac{\Delta M_1}{2} < x_1 < \frac{\Delta M_1}{2} \text{ and } -\frac{\Delta M_2}{2} < x_2 < \frac{\Delta M_2}{2} \\ 0; & \text{else,} \end{cases}$$

then $h'_2$ can be computed graphically as depicted in FIG. 12. The coordinate $x+x_{b_k}$ sets the starting point 76 of the line 78 shown in the figure, at time $\tau=0$. The integral follows the line 78 to its endpoint 80 at $\tau=T_a$, and the result is simply the length of the line segment 78 that intersects the aperture 68.

Figure 13:
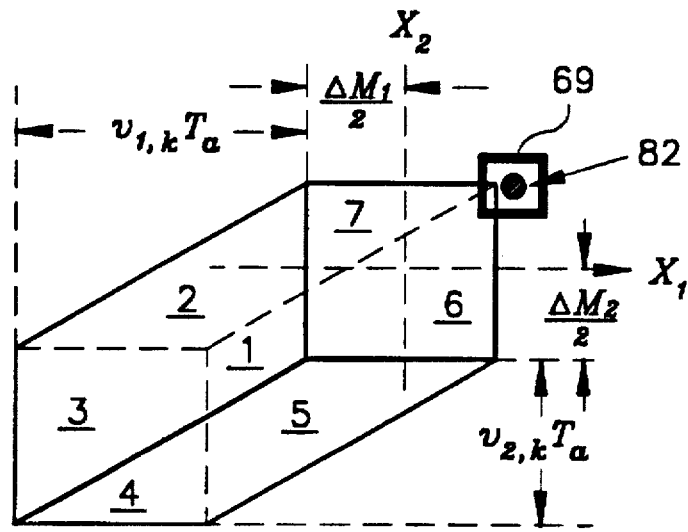
FIG. 13 is a diagram useful in describing the segmentation of $h'_2(x_1-x_1b_k,x_2-x_{2,b_l})$ into regions.

To further describe the blur $h'_2$, consider the case where $v_{1,k}T_a > \Delta M_1$ and $v_{2,k}T_a > \Delta M_2$. The point spread function $h'_2(x-x_{b_k})$ (the shift is used for convenience) can then be segmented into regions within the $(x_1, x_2)$ plane, as shown in FIG. 13. In each of the 7 regions depicted in the figure, the value of $h'_2(x-x_{b_k})$ is described by a linear equation in $x_1$ and $x_2$. For instance, in the region marked with the number 1, which is a parallelogram, the value of $h'_2$ is constant. In the trapezoidal region marked with a 2, $h'_2$ is found using the equation $$h'_2(x_1 - x_{1,b_k}, x_2 - x_{2,b_k}) = \tag{18}$$

$$K\left(\left(v_{2,k}\left(x_1 + \frac{\Delta M_1}{2} + v_{1,k}T_a\right)\right) - \tag{19}$$

$$v_{1,k}\left(x_2 - \left(\frac{\Delta M_2}{2} - v_{2,k}T_a\right)\right)\right),$$

for all $(x_1, x_2)$ within Region 2, where K is a scaling constant that can be accounted for by normalizing the discrete PSF $h_{t_r}$.

The discrete PSF $h_{t_r}$ (15) is computed by integrating over the volume under the region $U_{t_r}(n_1, n_2)$ 69 shown in FIG. 13. The center 82 of this region 69 is located at $x=x_s(m_1, m_2, k) + x_{b_k} - x_{t_r}(n_1, n_2)$, where $x_{t_r}(n_1, n_2)$ is defined similarly to $x_s(m_1, m_2, k)$. Thus, $h_{t_r}(x_1 - x_{1,b_k}, x_2 - x_{2,b_k})$ is computed by finding the volume under $h'_2(x_1 - x_{1,b_k}, x_2 - x_{2,b_k})$, in the region 69, whose position is determinedly $(m_1, m_2)$ and $(n_1, n_2)$.

The optical blur $h_o(x,t)$ can be subsequently taken into account using a discrete approximation by carrying out the convolution $$h_{t_r}(n_1, n_2; m_1, m_2, k) **_{n_1, n_2} h_o^a(n_1, n_2) \tag{20}$$

where $h_o^a(n_1, n_2)$ is the discrete representation of the focus blur for the $k^{th}$ lower resolution image, and $**_{n_1, n_2}$ denotes 2-D discrete convolution over the variables $(n_1, n_2)$. By taking the optical blur into account in this way, we are making the assumption that the blur PSF $h_{t_r}$, within a region about $x_s(m_1, m_2, k)$, is approximately LSI. This is a reasonable assumption as long as the image has not undergone an extreme non-translational motion. Handling the optical blur as in (20) is attractive, since $h_{t_r}$ can easily be computed when the optical blur is not considered, and the convolution in (20) is easy to implement. In a preferred implementation, the optical blur PSF is set equal to a Gaussian with unity variance and with 5×5 pixel support, expressed in terms of high resolution sampling lattice.

2) General motion.

Figure 14:
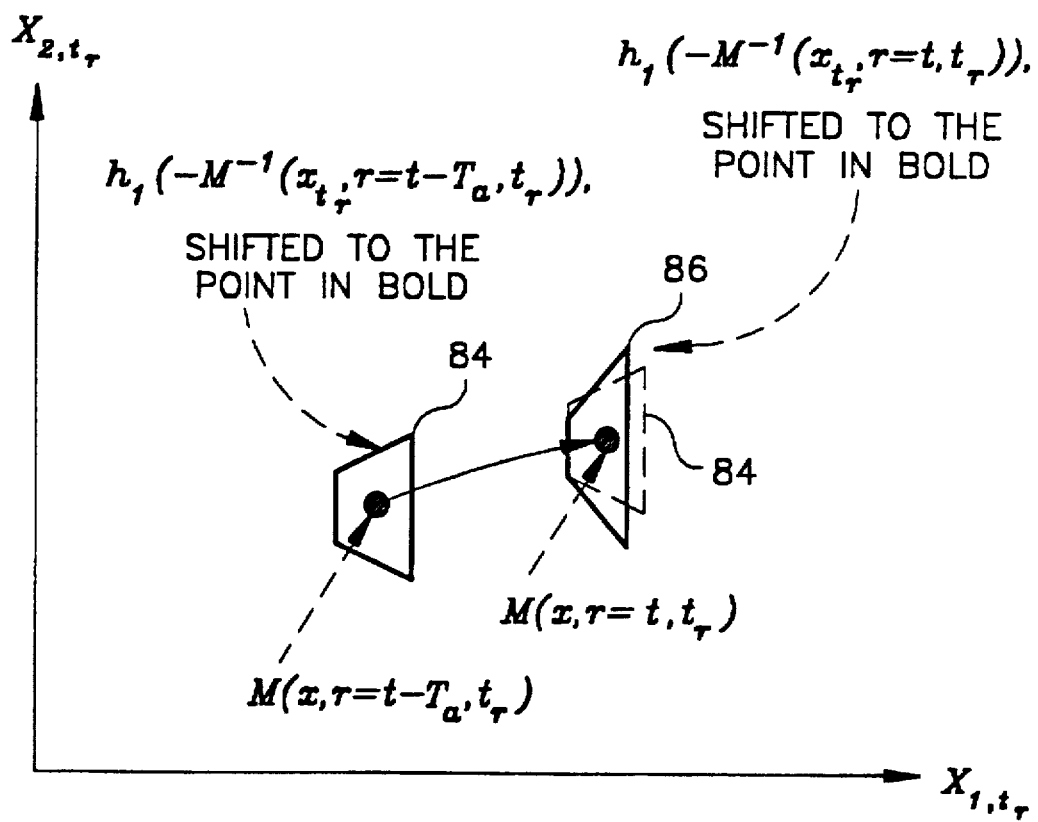
FIG. 14 is a diagram useful for describing the approximation used for affine and perspective motion models in computing the combined effective blur PSF.

We now extend this method for computing the blur to the case of more complex motions, such as those described by affine or perspective transformations. The extension is based on the following observation: the transformation due to motion between the times $t_r$ and $t_k$ may be significant, however, the non-translational component of the transformation that effects the blur shape will be small during the aperture time. This concept is demonstrated in FIG. 14. The figure is a graphical representation of the computation described in (11), which is rewritten here as $$h_2(x; x_{t_r}, t, t_r) = \int_{t-T_a}^{t} h_1(x - M^{-1}(x_{t_r}, \tau, t_r)) U(M(x_{t_r}, \tau, t_r))^{-1} d\tau \tag{21}$$

The figure depicts the transformed blur kernel $h_1(.)$ as it translates across the plane $x_{t_r}$ during the integration time, from $t-T_a$ 84 to t 86. The value of $h_2(.)$ is then the "dwell" time over $x_{t_r}$, weighted by the Jacobian and the amplitude of $h_1(.)$. Computation of (21) is difficult since the translating kernel $h_1$ in (21) is continuously transforming during the integration period. As previously pointed out, however, the non-translational component of this transformation, during the aperture time, is assumed to be small. This effect is demonstrated in FIG. 14 by showing the dotted outline of the function $h_1(M^{-1}(x_{t_r}, t-T_a, t_r))$ 84 superimposed on $h_1(M^{-1}(x_{t_r}, t, t_r))$ 86. In terms of (21), the approximation makes the assumptions that: (i) the Jacobean weighting is a constant, (ii) the transformation $M(x_{t_r}, \tau-T_a, t_r)$ is maintained throughout the aperture time (i.e., this function only translates as $\tau$ changes), and (iii) the path of translation during two consecutive frames, and thus within the aperture time, is linear. With this approximation, (21) can be rewritten as $$U(M(M(x,t-T_a,t_r),\tau,t_r))^{-1} \int_{t-T_a}^{t} h_1(l(x,\tau) - M^{-1}(x_{t_r}, t-T_a, t_r)) d\tau \tag{22}$$

where, $$l(x,\tau) = \frac{T-\tau}{T} x + \frac{\tau}{T} M^{-1}(M(x,t-T_a+t,t_r),t-T_a,t_r) \tag{23}$$

and T is the time between consecutive frames.

Using this approximation, the same procedure for computing the blur in the case of spatially uniform, temporally piece wise constant-velocity translational motion is used, except that at each point x the blur is computed with the appropriate transformation applied to the rectangular function 68 depicted in FIG. 12. To summarize, when the transformation is defined by uniform and constant translations, the approximation will result in an exact blur computation. When the transformation is affine, the Jacobean does not vary with $x_{t_r}$, but we have approximated it to be constant over time, while the aperture is open. Additionally, the translation is assumed to be constant-velocity, where this may not necessarily the case. In the case of perspective motion, the approximation has the same effects as in the affine case, with the additional approximation that the Jacobean is constant over the spatial blur support of $h_1(.)$.

C. Reconstruction of The High Resolution Image

Given the combined blur PSF, $h_{t_r}$, the motion estimation accuracy map, $A(m_1, m_2, k)$, motion vector field estimates from lower resolution images to the reference image, and the high resolution sampling lattice, the high resolution image is reconstructed using the following technique based on the method of POCS. In POCS, the desired image distribution is assumed to be a member of a mathematical vector space, such as the P-dimensional vector space, for a N1 pixels by N2 lines (P=N1×N2) high resolution image. The method of POCS requires the definition of closed convex constraint sets within this vector space, that contain the actual high resolution image. Mathematical intersection of these sets contain the actual high resolution image since it is contained in each one of them. An estimate of the actual high resolution image is then defined as a point in the intersection of these constraint sets, and is determinedly successively projecting an arbitrary initial estimate onto the constraint sets, as is well known in the literature.

Associated with each constraint set is a projection operator P, mapping an arbitrary point within the space, but outside the set, to the closest point within the set. Relaxed projection operators, $T=(1-\lambda)I+\lambda P$; $0<\lambda<2$, where I denotes the identity operator, can also be defined and used in finding an estimate in the intersection set.

We now describe how we utilize the principles of POCS in developing a method to solve the high resolution reconstruction problem at hand. We define the following closed, convex constraint set, for each pixel within lower resolution image sequence $g(m_1,m_2,k)$ provided that $A(m_1,m_2,k)=1$:

$$C_{t_r}(m_1,m_2,k) = \{y(n_1,n_2,t_r): |r^{(y)}(m_1,m_2,k)| \leq \delta_o\}, \quad (24)$$

where $$r^{(y)}(m_1,m_2,k) = g(m_1,m_2,k) - \sum_{n_1,n_2} y(n_1,n_2,t_r) h_{t_r}(n_1,n_2;m_1,m_2,k), \quad (25)$$

is the residual associated with an arbitrary member, y, of the constraint set. In other words, constraint sets are only defined when motion estimation is accurate. We refer to these sets as the data consistency constraint sets. The quantity $\delta_o$ is an a priori bound reflecting the statistical confidence with which the actual image is a member of the set $C_{t_r}(m_1,m_2,k)$. Since $r(f)(m_1,m_2,k)=v(m_1,m_2,k)$, where f denotes the actual high resolution image, the statistics of $r(f)(m_1,m_2,k)$ are identical to those of $v(m_1,m_2,k)$. Hence the bound $\delta_o$ is determined from the statistics of the noise process so that the actual image (i.e., the ideal solution) is a member of the set within a certain statistical confidence. For example, if the noise has Gaussian distribution with standard deviation $\sigma$, $\delta_o$ is set equal to $c\sigma$, where $c\sigma$ is determined by an appropriate statistical confidence bound (e.g., $c=3$ for 99% confidence).

It is also possible, in practice, to directly adjust the value of $\delta_o$. As $\delta_o$ increases, the reconstructed image becomes sharper but noisy. As $\delta_o$ decreases, the resulting reconstruction becomes less noisy but smoother. In our extensive tests, setting $\delta_o$ equal to 0.01 has resulted in fairly rapid convergence of the POCS method to an image with sufficiently good quality.

Note that the sets $C_{t_r}(m_1,m_2,k)$ can be defined only for those spatial locations where samples of the lower resolution images are available. This enables the invention to be applicable to any arbitrary lower resolution sampling lattice. Further, the sets $C_{t_r}(m_1,m_2,k)$ can be defined only for those samples of the lower resolution images where there are no occlusions and uncovered regions, namely where motion can be estimated accurately. The latter makes the invention robust in the presence of changing scenes within a given motion imagery.

The projection $z(n_1,n_2,t_r)$ $P_{t_r}(m_1,m_2,k)[x(n_1,n_2,t_r)]$ of an arbitrary $x(n_1,n_2,t_r)$ onto $C_{t_r}(m_1,m_2,k)$ can be defined as:

$$P_{t_r}(m_1,m_2,k)[x(n_1,n_2,t_r)] = \begin{cases} x(n_1,n_2,t_r) + \frac{(r^{(x)}(m_1,m_2,k) - \delta_o)h_{t_r}(n_1,n_2;m_1,m_2,k)}{\sum_{o_1}\sum_{o_2} h_{t_r}^2(o_1,o_2;m_1,m_2,k)}, & r^{(x)}(m_1,m_2,k) > \delta_o \\ x(n_1,n_2,t_r), & -\delta_o \leq r^{(x)}(m_1,m_2,k) \leq \delta_o \\ x(n_1,n_2,t_r) + \frac{(r^{(x)}(m_1,m_2,k) + \delta_o)h_{t_r}(n_1,n_2;m_1,m_2,k)}{\sum_{o_1}\sum_{o_2} h_{t_r}^2(o_1,o_2;m_1,m_2,k)}, & r^{(x)}(m_1,m_2,k) < \delta_o \end{cases} \quad (26)$$

Additional constraints such as bounded energy, positivity, and limited support can be utilized to improve the results. We use the amplitude constraint set, $$C_A = \{y(n_1,n_2,t_r): \alpha \leq f(n_1,n_2,t_r) \leq \beta\}, \quad (27)$$

with amplitude bounds of $a=0$ and $b=255$. The projection $P_A$ onto the amplitude constraint set $C_A$ is defined as $$P_A[x(n_1,n_2,t_r)] = \begin{cases} 0, & x(n_1,n_2,t_r) < 0 \\ x(n_1,n_2,t_r), & 0 \leq x(n_1,n_2,t_r) \leq 255 \\ 255, & x(n_1,n_2,t_r) > 255 \end{cases} \quad (28)$$

Given the above projections, an estimate, $\hat{f}(n_1,n_2,t_r)$, Of the high resolution image $f(n_1,n_2,t_r)$, is obtained iteratively from all lower resolution images $g(m_1,m_2,k)$, where constraint sets can be defined, as $$\hat{f}_{l+1}(n_1,n_2,t_r) = T_a \tilde{T}[\hat{f}_l(n_1,n_2,t_r)], l=0, 1, 2, \quad (29)$$

where $\tilde{T}$ denotes a cascade of the relaxed projection operators, projecting onto the family of sets $C_{t_r}(m_1,m_2,k)$ defined as in (24)–(25). Any lower resolution image, bilinearly interpolated over the high resolution sampling lattice can be used as the initial estimate $\hat{f}_0(n_1,n_2,t_r)$. Choosing the lower resolution image with the best visual quality for initialization may increase the speed of reaching at an iteration number g at which a visually satisfactory high resolution image is reconstructed. In theory, the iterations continue until an estimate lies within the intersection of all the constraint sets. In practice, however, iterations are generally terminated according to a certain stopping criterion, such as visual inspection of the image quality, or when changes between successive estimates, as measured by some difference metric (i.e., $\|\hat{f}_l - \hat{f}_{l-1}\|$, using the $L_2$ norm), fall below a preset threshold.

Figure 15:
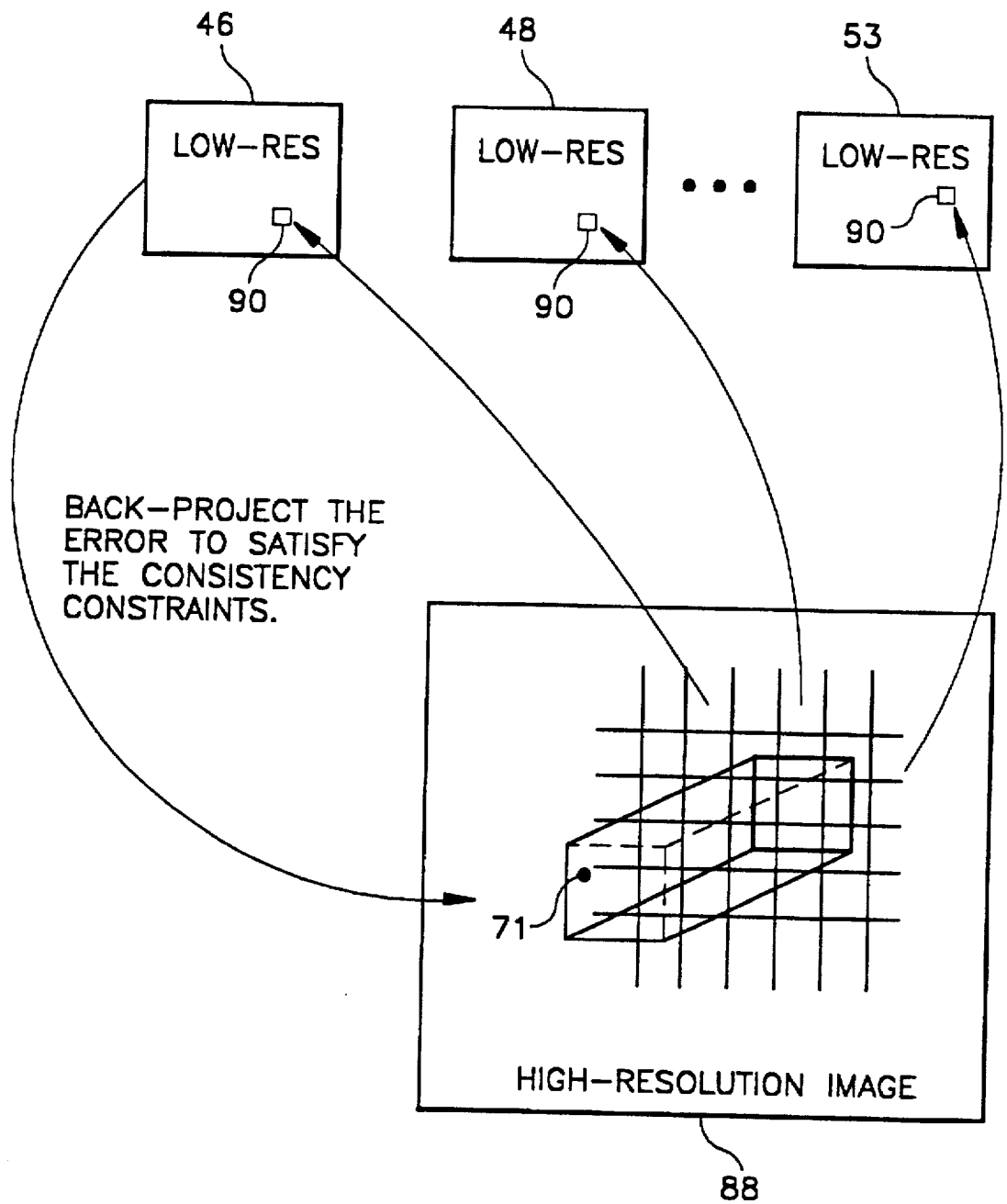
FIG. 15 is a diagram useful in describing the POCS-based reconstruction method.

A pictorial depiction of this method is given in FIG. 15. The combined LSV blur relates a region 71 of the current high resolution image 88 estimate, say $\hat{f}_l(.)$, to a particular pixel intensity $g(m_1,m_2,k)$ 90 in one of the lower resolution images 46, 48, 53. The residual term $r^{(f)}(m_1,m_2,k)$ is then formed, which indicates whether or not the observation could have been formed from the current high resolution image estimate (within some error bound determined by $\delta_o$), and therefore whether the high resolution estimate belongs to the data consistency set $C_{t_r}(m_1,m_2,k)$. If it is not in the set (i.e. the residual is too large), the projection operator $P_{t_r}(m_1,m_2,k)$ back projects the residual onto the current high resolution image 88 estimate (the additive term in (26)), thus forming a new estimate of the high resolution image that does belong to the set $C_{t_r}(m_1,m_2,k)$, and therefore could have given rise to the observation $g(m_1,m_2,k)$, within the bound $\delta_o$. Performing these projections over every lower resolution pixel 90 where a consistency constraint set is defined, completes the composite projection $\tilde{T}[\hat{f}(n_1,n_2,t_r)]$ referred to in (29). Subsequent projection onto the amplitude constraint set completes a single iteration of the POCS method, resulting in the next estimate $\hat{f}_{l+1}(.)$.

One possible implementation of the POCS based reconstruction method is as follows:

1. Choose the reference image, and thus the reference time $t_r$.
2. Specify the high resolution lattice, and determine the ratio between the density of the high resolution lattice and the lower resolution rectangular lattice over which the image values are generated via bilinear interpolation for motion estimation purposes. We refer to this ratio as r. (For instance, r=2 in the examples given in FIGS. 2 and 6.)
3. Perform motion estimation: spatially bilinearly interpolate each lower resolution image $g(m_1,m_2,k)$ to lower resolution rectangular lattice; estimate motion from each interpolated lower resolution image, to the interpolated lower resolution image at $t_r$; scale each valid mapping transformation from the lower resolution images to the high resolution image by scaling the estimated motion vectors by r.
4. Determine the motion estimation accuracy map for each low resolution image.
5. Define sets $C_{t_r}(m_1,m_2,k)$ according to (24), for each pixel site $(m_1,m_2,k)$ where the motion estimation is accurate, i.e., for $A(m_1,m_2,k)=1$.
6. Compute the combined blur PSF $h_{t_r}(n_1,n_2;m_1,m_2,k)$ for $(m_1,m_2,k)$ where the sets $C_{t_r}(m_1,m_2,k)$ have been defined.
7. Set $\hat{f}_0(n_1,n_2,t_r)$ equal to the lower resolution image that has the best visual quality, after bilinearly interpolating it over the sampling lattice of the high resolution image.
8. For all sites $(m_1,m_2,k)$ where the sets $C_{t_r}(m_1,m_2,k)$ according to (25); back-project the $(m_1,m_2,k)$ have been defined: compute the residual $r^{(f)}(m_1,m_2,k)$ according to (25); back-project the residual $r^{(f)}(m_1,m_2,k)$ using the projection $P_{t_r}(m_1,m_2,k)$ in (26).
9. Perform the amplitude projection PA using (28).
10. If the stopping criterion is satisfied then stop, otherwise go to Step 8.

After the stopping criteria is satisfied, the image may then be displayed, stored for future display, or transmitted for remote display.

A microfiche Appendix containing a computer program written in the C++ program language is included. Part 1 of the Appendix implements the Motion Estimation portion of the invention, Part 2 implements the Blur Computation and Hi-Resolution Reconstruction portion of the invention, and Part 3 implements the generation of the motion estimation accuracy map. A computer program product may be produced by storing the above described computer program on a computer readable storage medium comprising for example: magnetic storage media such as a magnetic disc (floppy disc), or magnetic tape; optical storage media such as an optical disc, optical tape or machine readable bar code; solid state electronic storage devices such as random access memory (RAM) or read only memory (ROM); or any other physical device or medium employed to store a computer program.

The invention has been described with reference to a preferred embodiment. However, it will be appreciated that variations and modifications can be effected by a person of ordinary skill in the art without departing from the scope of the invention.

Parts List:
10 lower resolution images
12 provide mapping transformation step
13 generate accuracy map step
14 compute combined PSF step
16 create high resolution image step
18 display high resolution image step
20 video camcorder/VCR
22 digitizer
24 digital still camera
26 digital video camcorder
28 digital scanner
30 disc storage
32 image processing computer system
34 computer
36 CRT
38 keyboard
40 printer
42 storage medium
44 communication network
46, 48, 50 low resolution images
52 region of interest
53 low resolution image
54 diamond shaped sampling lattice
56 rectangular sampling lattice
57 3×3 window of pixels
58 actual pixels from input images
60 optical system blur model
62 aperture time model
64 low resolution sampling model
66 additive noise model
68 sensor aperture
69 high resolution sampling regions
70 image
71 area swept by sensor aperture
73 center of sensor aperture
76 starting point
78 line
80 end point
82 center of region
84 transformed blur kernel
86 transformed blur kernel
88 high resolution image
90 low resolution image pixel
100 generate dynamic threshold step
102 estimate standard deviation image step
104 quantize standard deviation image step
106 scale user specified maximum threshold step
108 compute the summed absolute difference (SAD) image step
110 compare the SAD image with threshold step
112 apply morphological erosion and dilation step

We claim:

1. A method for creating a high resolution image from a sequence of lower resolution motion images, comprising the steps of:
   a. producing a mapping transformation for each lower resolution image to map pixels in each lower resolution image into locations in the high resolution image;
   b. computing a combined point spread function (combined PSF) for each pixel in each lower resolution image employing the mapping transformations, by:
      i. calculating an effective sensor aperture relative to the high resolution image for each pixel in each lower resolution image employing the mapping transformations;
      ii. calculating PSF's for the effective sensor apertures;
      iii. defining an optical PSF; and
      iv. combining the calculated PSF for each pixel with the optical PSF to produce the combined PSF for each pixel;

c. generating the high resolution image from the lower resolution images employing the combined PSF by projection onto convex sets (POCS); and d. displaying the high resolution image.

2. The method claimed in claim 1, wherein the step of producing a mapping transformation includes:

a. selecting one of the lower resolution images as a reference image;

b. estimating a mapping transformation describing the relative motion at each pixel between the reference lower resolution image and each other lower resolution image;

c. testing the validity of the estimated mapping transformation for each other lower resolution image pixel and generating a motion accuracy map representing valid mapping transformations for each other lower resolution image; and d. scaling each valid mapping transformation from the lower resolution images to the high resolution image.

3. The method claimed in claim 1, wherein the step of generating the high resolution image by POCS includes:

a. interpolating one of the lower resolution images to the number of pixels in the high resolution image to produce an estimate of the high resolution image; and b. for each pixel in each low resolution image having a valid mapping transformation, refining the estimate of the high resolution image by, i. selecting a pixel in one of the lower resolution images, ii. producing a calculated pixel value from the high resolution image by applying the combined PSF for the selected pixel to the current estimate of the high resolution image, and iii. forming a difference between the selected pixel value and the calculated pixel value and f the magnitude of the difference is greater than a predetermined threshold, back projecting the difference into the current estimate of the high resolution image to produce a refined estimate of the high resolution image;

c. applying an amplitude constraint to the pixel values of the refined estimate of the high resolution image; and d. repeating steps b and c until a stopping criterion is satisfied.

4. A method for producing a high resolution video sequence from a sequence of lower resolution video images, comprising applying the method claimed in claim 1 a plurality of times to the sequence of lower resolution video images to produce a video sequence of high resolution images.

5. Apparatus for creating a high resolution image from a sequence of lower resolution motion images, comprising:

a. a source for producing a sequence of lower resolution motion images;

b. an image processor for receiving the sequence of lower resolution images and creating the high resolution image, including:

i. means for producing a mapping transformation for each low resolution image to map pixels in each low resolution image into locations in the high resolution image;

ii. means for computing a combined point spread function (combined PSF) for each pixel in each lower resolution image employing the mapping transformations, the means for computing a combined point spread function including means for calculating an effective sensor aperture relative to the high resolution image for each pixel in each lower resolution image employing the mapping transformations, means for calculating PSF's for the effective sensor apertures, means for defining an optical PSF, and means for combining the calculated PSF for each pixel with the optical PSF to produce the combined PSF for each pixel;

iii. means for generating the high resolution image from the lower resolution images employing the combined PSF by projection onto convex sets (POCS); and c. a display device for displaying the high resolution image.

6. The method claimed in claim 2, wherein the step of testing the validity of the estimated mapping transformation for each other lower resolution image pixel, further comprises the steps of:

a. determining a threshold;

b. computing a summed absolute difference image;

c. comparing the summed absolute difference image with the threshold to produce an initial motion accuracy map; and d. employing morphological erosion and dilation to the initial motion accuracy map to produce a final motion accuracy map.

7. The method claimed in claim 6, wherein the step of determining a threshold, further comprises the steps of:

a. estimating a standard deviation image by computing a sample standard deviation at every original pixel location of the other lower resolution images;

b. quantizing the standard deviation image to two levels; and c. scaling the quantized two level image by a predetermined maximum threshold.

8. A computer program product, comprising a computer readable storage medium having a computer program stored thereon for creating a high resolution image from a sequence of lower resolution motion images, by the steps of:

a. producing a mapping transformation for each lower resolution image to map pixels in each lower resolution image into locations in the high resolution image;

b. computing a combined point spread function (combined PSF) for each pixel in each lower resolution image employing the mapping transformations, by i. calculating an effective sensor aperture relative to the high resolution image for each pixel in each lower resolution image employing the mapping transformations;

ii. calculating PSF's for the effective sensor apertures;

iii. defining an optical PSF; and iv. combining the calculated PSF for each pixel with the optical PSF to produce the combined PSF for each pixel;

c. generating the high resolution image from the lower resolution images employing the combined PSF by projection onto convex sets (POCS); and d. displaying the high resolution image.

* * * * *